United States Patent
Barringer

(10) Patent No.: US 8,964,021 B2
(45) Date of Patent: Feb. 24, 2015

(54) RADIATION TOLERANT CAMERA

(75) Inventor: Niklas Barringer, Viken (SE)

(73) Assignee: ISEC Industrial Security AB, Hoganas (SE)

( * ) Notice: Subject to any disclaimer, the term of this patent is extended or adjusted under 35 U.S.C. 154(b) by 292 days.

(21) Appl. No.: 13/258,349

(22) PCT Filed: Mar. 30, 2010

(86) PCT No.: PCT/SE2010/050349
§ 371 (c)(1),
(2), (4) Date: Sep. 21, 2011

(87) PCT Pub. No.: WO2010/114469
PCT Pub. Date: Oct. 7, 2010

(65) Prior Publication Data
US 2012/0013729 A1    Jan. 19, 2012

(30) Foreign Application Priority Data

Mar. 30, 2009   (SE) .................................. 0950199-0

(51) Int. Cl.
*H04N 5/00*   (2011.01)
*H04N 5/225*   (2006.01)
*G03B 17/02*   (2006.01)
*G21F 5/10*   (2006.01)
*G21C 17/003*   (2006.01)

(52) U.S. Cl.
CPC ........... *H04N 5/2252* (2013.01); *H04N 5/2251* (2013.01); *G03B 17/02* (2013.01); *H04N 2005/2255* (2013.01); *G21F 5/10* (2013.01); *G21C 17/003* (2013.01)
USPC .......................................................... 348/82

(58) Field of Classification Search
CPC ........................... H04N 5/2252; H04N 5/2257
USPC ............................................................ 348/82
See application file for complete search history.

(56) References Cited

U.S. PATENT DOCUMENTS

| | | | | |
|---|---|---|---|---|
| 4,063,458 A | * | 12/1977 | Vogt et al. | 374/125 |
| 5,839,284 A | * | 11/1998 | Wyatt et al. | 62/3.2 |
| 6,144,031 A | * | 11/2000 | Herring et al. | 250/352 |
| 7,402,802 B1 | * | 7/2008 | Terre et al. | 250/330 |
| 7,634,059 B2 | * | 12/2009 | Wraight | 378/89 |
| 7,790,253 B2 | * | 9/2010 | Chang | 428/35.7 |

(Continued)

FOREIGN PATENT DOCUMENTS

| | | |
|---|---|---|
| GB | 921100 A | 3/1963 |
| JP | 06265683 U | 9/1994 |

(Continued)

OTHER PUBLICATIONS

International Search Report for PCT/SE2010/050349, Completed by the European Patent Office on Jun. 15, 2010, 3 Pages.

*Primary Examiner* — Sath V Perungavoor
*Assistant Examiner* — Jeffery Williams
(74) *Attorney, Agent, or Firm* — Christensen O'Connor Johnson Kindness PLLC

(57) ABSTRACT

A Radiation tolerant camera, including a camera module and having an electronic image sensor. The camera module is arranged in a radiation shielding enclosure, the enclosure having an opening for allowing passage of light into the image sensor. Furthermore, the camera module is connected to a heat absorbing cooling element dissipating heat from the camera module.

16 Claims, 3 Drawing Sheets

(56) References Cited

U.S. PATENT DOCUMENTS

2002/0003584 A1* 1/2002 Kossin ................. 348/373
2004/0026624 A1* 2/2004 Wainer et al. ......... 250/370.09

FOREIGN PATENT DOCUMENTS

| | | |
|---|---|---|
| JP | 08094790 U | 4/1996 |
| JP | 11-191855 A | 7/1999 |
| JP | 2000-321394 A | 11/2000 |
| JP | 3085206 U | 1/2002 |
| JP | 2002-71876 A | 3/2002 |
| JP | 2003-143449 A | 5/2003 |
| JP | 2003-289458 A | 10/2003 |
| JP | 2003289458 A * | 10/2003 |
| JP | 2004-343195 A | 12/2004 |
| JP | 2004343195 A | 12/2004 |
| JP | 2005-121469 A | 5/2005 |
| JP | 2006-91399 A | 4/2006 |
| JP | 2006-287723 A | 10/2006 |
| JP | 2006287723 A | 10/2006 |
| WO | 2004/051986 A1 | 6/2004 |
| WO | 2004051986 A1 | 6/2004 |

* cited by examiner

123
RADIATION TOLERANT CAMERA

CROSS-REFERENCE TO RELATED APPLICATION

This application is the U.S. national phase of PCT Appln. No. PCT/SE2010/050349 filed Mar. 30, 2010 which claims priority to Swedish application 0950199-0 filed Mar. 30, 2009, the disclosures of which are incorporated in their entirety by reference herein.

TECHNICAL FIELD

The invention relates to a radiation tolerant camera, comprising a camera module having an electronic image sensor and a radiation shielding enclosure, said enclosure having an opening for allowing passage of light into the image sensor. The camera is formed to be used mainly for monitoring purposes in environments with strong ionizing radiation, mainly neutron and gamma radiation. In the nuclear energy industry it can be used in reactor and containment surveillance system, fuel pool inspection and inspection "missions" for decommissioning. It can also be used in radiotherapy industry for instance for patient monitoring during radiotherapy. The invention is specifically directed to be operated in a neutron radiation environment.

PRIOR ART

In many applications today tube cameras are used in the environments mentioned above because they are more radiation tolerant compared to cameras that are provided with CCD or CMOS image sensors. It is normally possible to separate any required electronic control units from the radio active environment and thus avoid or limit some severe effects of the radiation. The conditions of using other types of cameras and specifically digital cameras however are different.

Ionizing radiation affects and finally destroys electronic equipment, specifically low voltage and more compact circuits and circuits with high spatial resolution. The ionizing radiation mainly causes temporary damages, so called soft errors or single-event damages, and permanent damages, so called atomic displacement.

Commercially available devices of today suffer from these effects and produce images of continuously deteriorating quality. The cameras and associated control logic will be broken or have a decreased performance level only after a short period of use in the above described harsh environment. There is still a need for better image quality that can be achieved with digital image sensors and also a need for cameras that will last longer in such environments.

SUMMARY OF THE INVENTION

In accordance with the invention a digital camera module having an electronic image sensor is enclosed by a radiation shielding enclosure. An opening in the enclosure will allow passage of light into the image sensor. The enclosure is made from a material that has low-mass nuclei. In such a material neutrons can transfer large amounts of their energy to the light nuclei through collisions. In numerous embodiments boron is added to the enclosure material so as to capture thermal neutrons resulting from the collisions.

The complete enclosure in one embodiment can be pivoted or tilted between various operating positions in which the opening is uncovered and directed towards an observed object and a resting position in which the opening is directed towards a shield of radiation shielding material. A back side of the enclosure will be efficiently protected by the shield in the operating position.

The opening of the enclosure preferably is covered with a transparent front cover allowing transmission of light and allowing an image to be picked up by the image sensor. The size of the transparent front cover is sufficient for providing a desired viewing angle. Preferably, the front cover also is made from a material that has low-mass nuclei.

To improve further the shielding against effects of the radiation the camera module is thermally connected to a heat absorbing cooling element that will facilitate and improve dissipation of heat from the camera module.

The cooling element can include a thermoelectric cooling module, such as a module using the Peltier effect. The cooling capacity of the cooling module can be further improved by heat dissipating means extending exterior of the enclosure from the cooling element. In one embodiment the heat dissipating means comprises heat pipes. By cooling the camera module to lower temperatures, such as a few degrees above zero, or about 2° C. to 5° C., the image quality from the camera module will be substantially improved.

The enclosure can have an average thickness of a few centimeters, such as about five centimeters. At such a thickness the material will provide sufficient neutron radiation attenuation.

In various embodiments the camera module comprises a standard camera including sensor and associated electronics that is mounted in an insulated and sealed housing. In various embodiments the housing comprises a moisture-proof layer, so as to ensure that the moisture content within the housing is maintained at a low level. A further radiation shielding layer made of lead, tungsten or another material having similar shielding and constructional properties can be arranged to shield the camera module from other radiation, such as gamma radiation.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
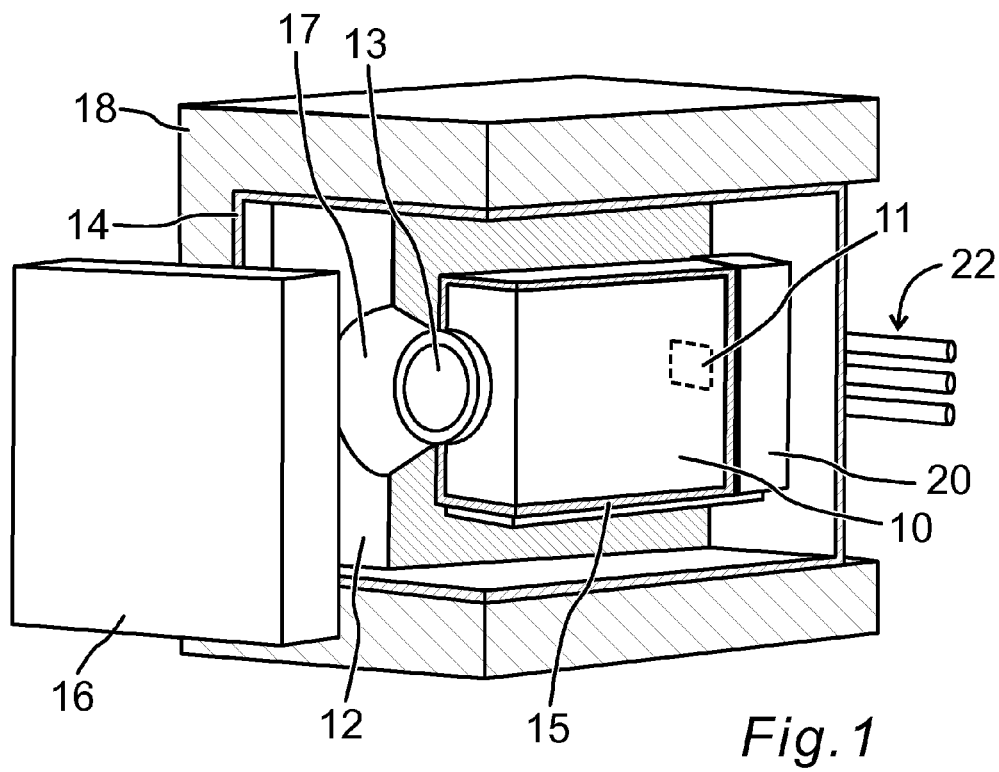
FIG. 1 is a schematic perspective and partly sectioned view of an embodiment of a camera in accordance with the invention including a camera module.

The embodiment shown in FIG. 1 comprises a camera module 10 including a conventional digital image sensor 11 and a lens package 13. The camera module 10 is embedded in an insulating body 12 made of a material having a low thermal conductivity. The insulating body 12 is enclosed by a housing 14. Preferably the camera module fits close to the insulating body and the insulating body to the housing 14 so as to reduce the amount of air within the housing and to avoid condensation at any optical component. In some embodiments any remaining air is replaced by another suitable gas, such as $CO_2$ or N. In the embodiment shown in FIG. 1 a further radiation shielding layer 15 is provided between the camera module 10 and the insulating body 12.

The housing 14 is made of an air tight and neutron radiation shielding material, such as plastic or similar material and is completely sealed. The radiation shielding layer 15 is provided mainly as a gamma or X-ray shielding means. A front side of the housing 14 as well as of the radiation shielding layer 15 forms an opening which is closed by a transparent front panel 16. The insulating body 12 is formed with an orifice 17 facing the transparent front panel 16. The orifice 17 of the insulating body 12 is bevelled from the position of the lens package 13 to a wider open space adjacent to the front panel 16.

Figure 2:
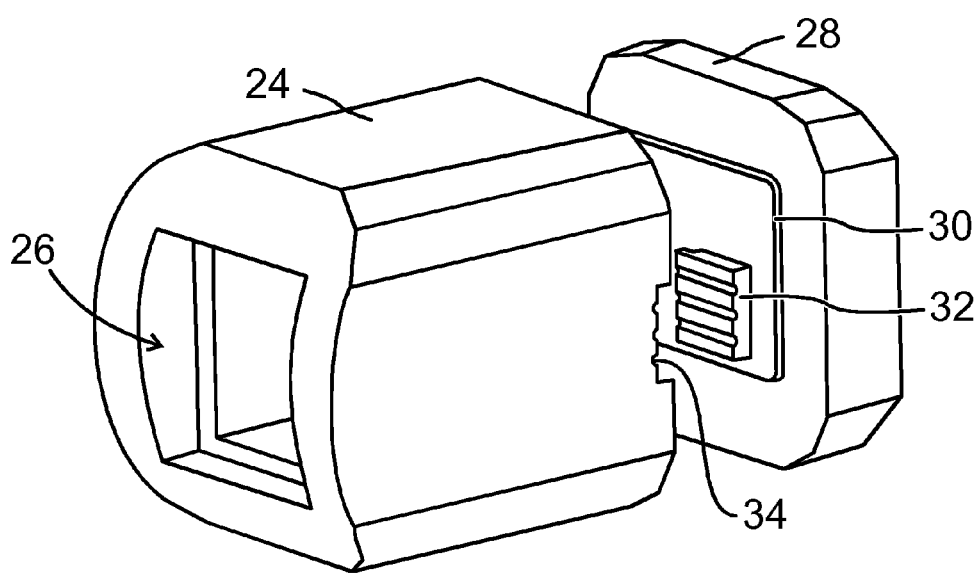
FIG. 2 is a schematic perspective view of an embodiment of an enclosure included in a camera in accordance with the invention.

The housing 14 is enclosed in an enclosure 18 formed by a first box like part and a second back side part, c.f. also FIG. 2. Outer dimension of the housing 14 correspond very well with inner dimensions of the enclosure 18 so as to minimize free space there between. The enclosure provides as an efficient neutron radiation shield.

Figure 3:
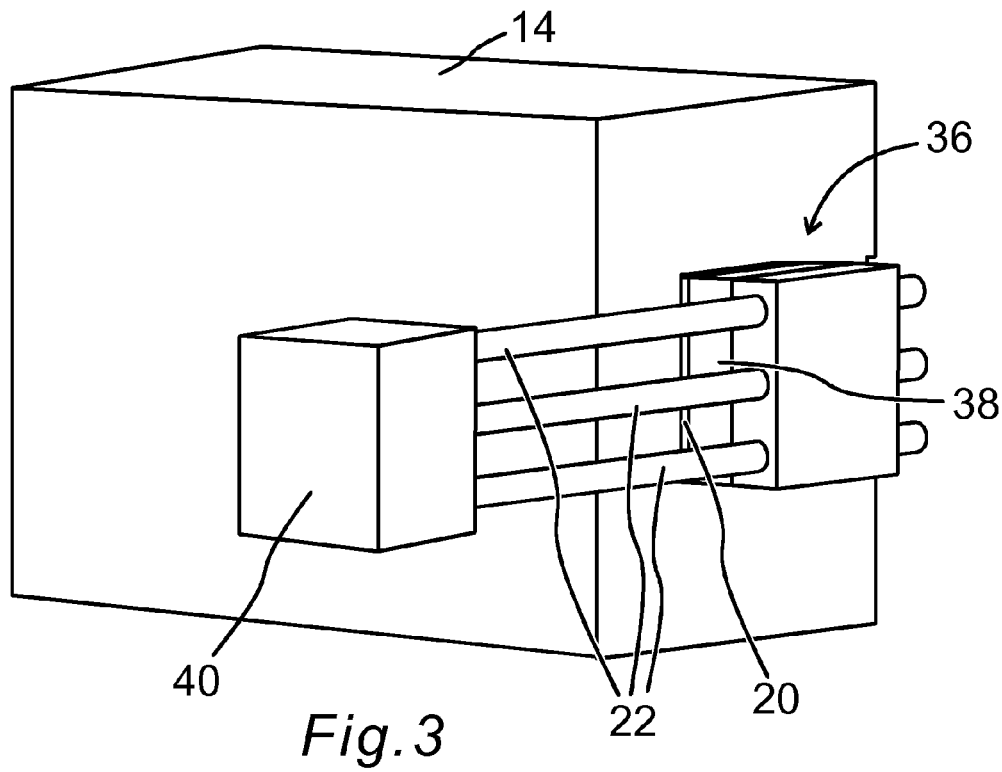
FIG. 3 is a schematic perspective view of an embodiment of a housing with heat dissipating means included in a camera in accordance with the invention.

The image sensor 11 and also the camera module 10 as a whole are thermally connected to a heat absorbing cooling element 20. In the embodiment shown in FIG. 1 the cooling element 20 at one end extends from a back side of the camera module opposite to the lens package. An opposite end of the cooling element engages through an electrically insulating pod (not shown) the image sensor or a circuit board supporting the image sensor. The heat absorbing cooling element 20 extends partly out of the housing 14 where it is thermally connected to a cooling device, c.f. FIG. 3, and a plurality of heat pipes 22. The heat pipes extend out of the enclosure and transfer heat very efficiently to a heat sink mounted to the outside of the enclosure, c.f. FIG. 3. The cooling element 20 is designed to maintain the temperature of the camera module and any associated electronics at a temperature below 5° C., preferably at temperatures between 2° C. and 5° C.

Figure 4:
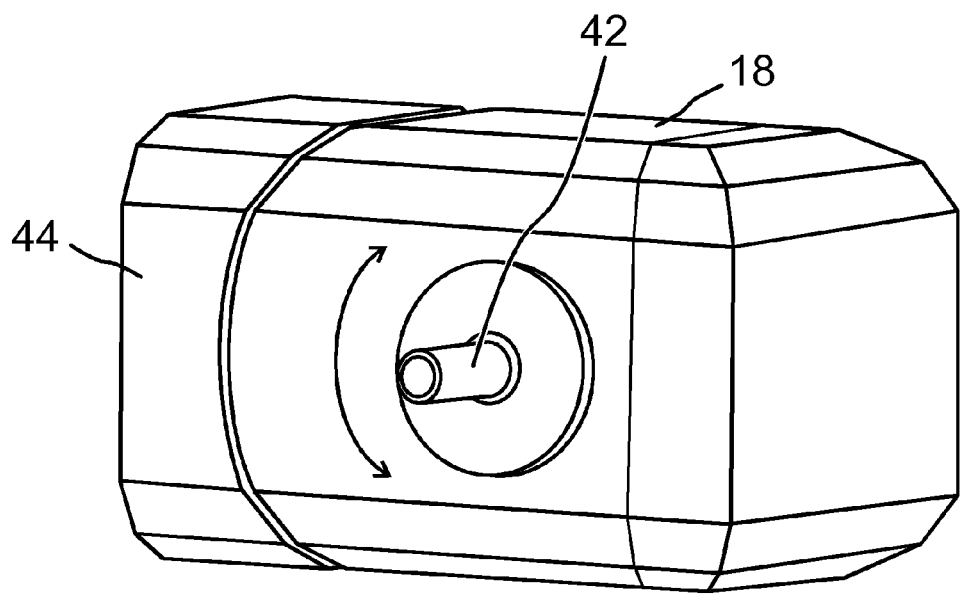
FIG. 4 is a schematic perspective view of the enclosure of FIG. 2 pivoted into a secured position.

As shown in FIG. 2 the enclosure 18 is divided into two separate parts. A first box like part 24 encloses basically the complete housing 14 with the camera module 10. An opening 26 in a front portion with cut in edge surfaces is dimensioned to receive the transparent front panel 16. The front portion is arched so as to be rotated into protection in a shield, c.f. FIG. 4.

A second part of the enclosure forms a backside 28 engaging in a tight manner the box like part 24. To further seal the connection between the box like part 24 and the backside 28 both parts can be formed with ribs 30 and corresponding recesses (not shown). The back side further comprises a support block 32 arranged for supporting the heat pipes. One side section of the box like part 24 is formed with indentations 34 receiving the heat pipes.

FIG. 3 shows a backside section of the housing 14 and a cooling device 36 which is thermally connected to the cooling element 20. The cooling device 36 in one embodiment comprises a Thermoelectric cooling module (TEC) 38. It is possible to provide a plurality of interconnected cooling modules, should there be need for it for obtaining a required temperature difference. In alternative embodiments the camera module is cooled by a conventional air and/or fluid cooling system.

The cooling device 36 further supports the heat pipes 22, extending through the enclosure and into a heat sink 40 provided on the outside of the enclosure. The heat sink 40 can comprise a finned element and if required a fan. The heat pipes 22 also are thermally connected to the cooling device 36. The heat pipes 22 extend during operating and resting conditions in a horizontal direction. The horizontal orientation of the heat pipes results in a constant heat transmission capacity during operation and in different tilting positions.

The enclosure 18 can be rotated around an axis 42 extending in a horizontal direction. In FIG. 4 the camera is shown in a resting and shielded position where the arched section of the front portion of the enclosure engages a shield 44 made of the same material or a similar radiation shielding material as the enclosure.

As shown in FIG. 4 the shield 44 is formed with one concave arched side corresponding to the arched front portion of the enclosure 18. As a result the complete camera can be rotated between adjustable active positions and a resting position in which the opening of the enclosure 18 is very well shielded by the shield 44 against radiation. The rotation between the active position and the resting position can be manually controlled by operating personnel or automatically controlled by a control system, for instance based on a time schedule.

Figure 5:
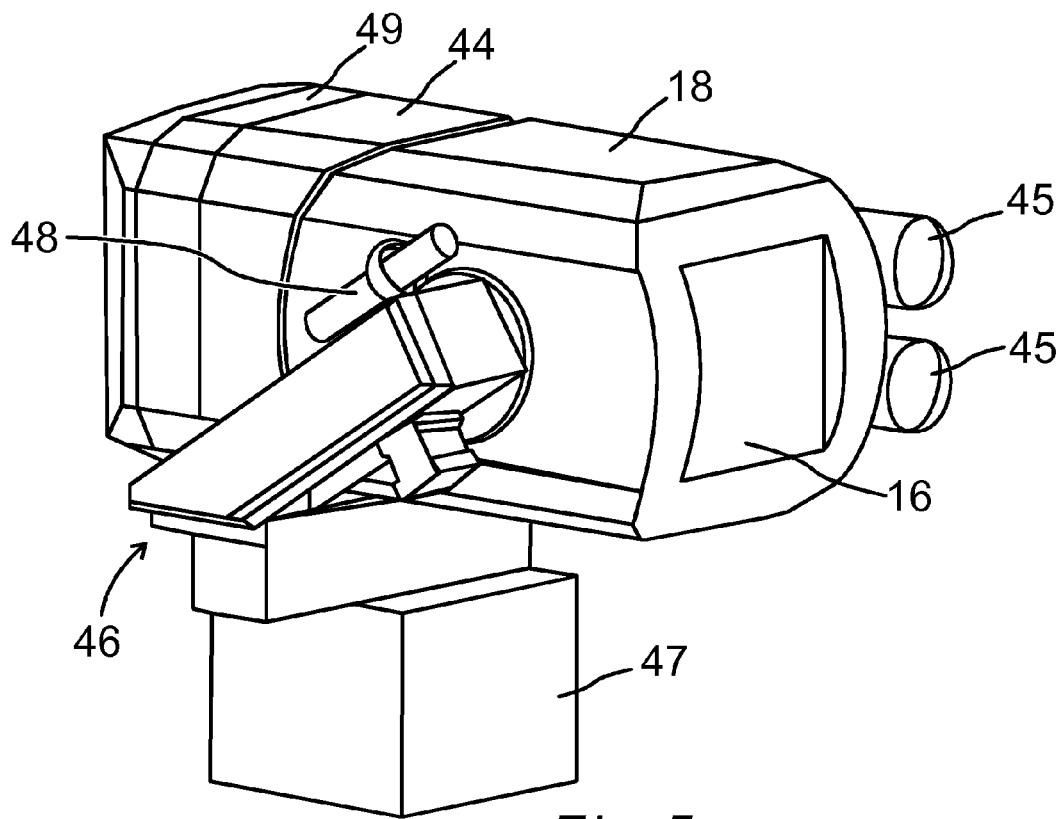
FIG. 5 is a schematic perspective view of an embodiment of a fully equipped camera in accordance with the invention and FIG. 6 is a schematic perspective view of an embodiment of a heat absorbing cooling element thermally connected to the camera module.

A fully equipped camera is shown in FIG. 5. In this embodiment the camera includes also lamps 45. The lamps preferably are mounted at the same side of the enclosure 18 as the heat pipes and heat sink so as not to restrain tilting movements of the camera. A pyrometer (not shown) can be mounted on a side of the enclosure or preferably inside the enclosure. The pyrometer can be provided with one or several laser indicators to indicate the direction and area of measurement to an operator of the camera.

The complete camera can be mounted at a fixed position on a wall bracket or a commercially available pan and tilt unit. In the embodiment shown in FIG. 5 the camera is mounted on a motorized support 46 which allows independent tilting and panning movements. A base unit 47 comprises a transformer, required electronic means and connecting means for connecting the camera and motorized support to a remotely arranged control position.

Sensitive electronic devices used for controlling and steering the camera can be arranged in a remote position or within an extension 49 of the shield 44. In this embodiment the radiation sensitive electronic devices together with power regulating devices are thermally connected to a cooling system formed by the heat pipes and the heat absorbing means. A microphone 48 is provided to obtain information about sound and noise appearing in the surrounding area. Preferably, the microphone is specifically designed and radiation hardened.

Figure 6:
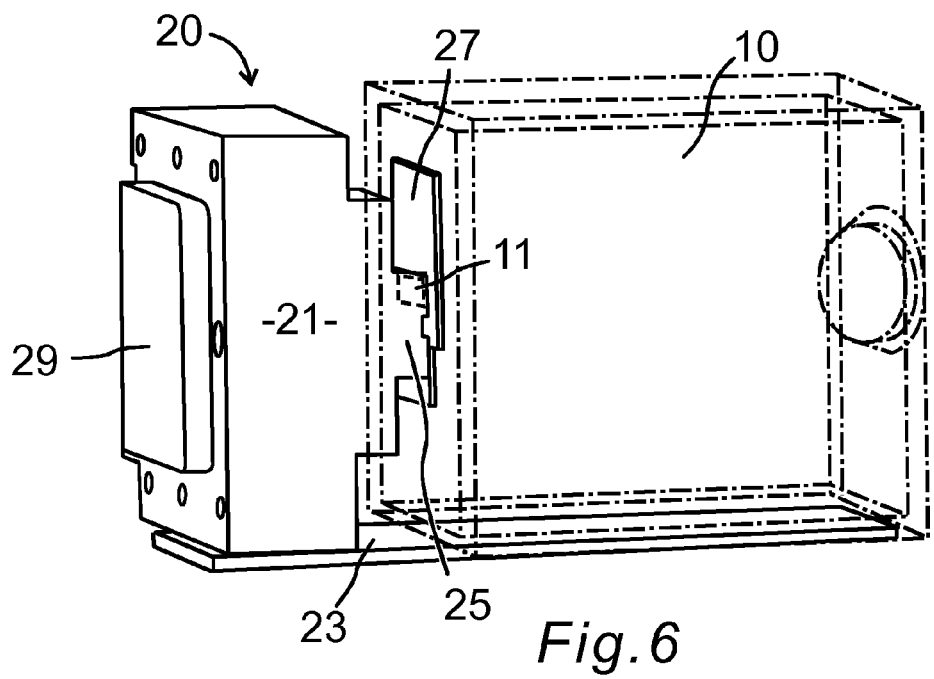

The embodiment of the heat absorbing cooling element 20 shown in FIG. 6 comprises a body 21 made of a material having high thermal conductivity such as a metal. The body 21 has rectangular side edges and a bottom side and a top side. The rectangular side edges have a height and width corresponding to the dimensions of the camera module 10. A base plate 23 extends from the bottom side of the body 21 and engages at least a substantial part of a bottom side of the camera module 10. The base plate will contribute to the heat transfer from the camera module.

The body 21 has protrusions on two opposite sides. A first protrusion 25 abuts the camera module 10 and more specifically a section of the camera module where a circuit board 27 supporting the digital image sensor 11 is situated. A second protrusion 29 is dimensioned to protrude through an opening of the housing 14 so as to ensure an efficient heat transfer out of the housing 14. The second protrusion 29 also will engage the cooling device 36 outside the housing 14 and inside the enclosure 18.

The material used for the radiation shielding enclosure and shield may include or be based on hydrocarbon plastics (such as polyethylene, polypropylene and polystyrene); natural and synthetic rubber (such as silicone rubber); and other plastics or resins containing atoms in addition to hydrogen and carbon (such as acrylic, polyester, polyurethanes and vinyl resins). These organic polymers show a high effectiveness of shielding against neutrons due to a large concentration of hydrogen atoms in these materials. The combination of a radiation shielding enclosure comprising hydrocarbon plastics and the efficient cooling of the camera module results in a higher image quality, in short term perspective as well as in a long term perspective.

Fast neutrons that are slowed down by repeated collisions with light nuclei form thermal neutrons that can be absorbed by nuclear reactions. The total neutron shielding ability of polyethylene can be improved if a good thermal neutron absorbing material is added to it. An appropriate thermal neutron absorbing material is boron.

The material used for the transparent front panel 16 preferable is fully transparent so as to produce a true image of any object in front of the camera module. In a preferred embodiment materials having a high hydrogen content are used, for instance Polymethylmethacrylate (PMMA) known as PLEXIGLAS.

While certain illustrative embodiments of the invention have been described in particularity, it will be understood that various other modifications will be readily apparent to those skilled in the art without departing from the scope and spirit of the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. An ionizing radiation tolerant camera, comprising:
a camera module comprising, an electronic image sensor and a lens package, said electronic image sensor and lens package are in fixed alignment to each other,
an ionizing radiation shielding enclosure within which said camera module is disposed, said ionizing radiation shielding enclosure defining an opening for allowing passage of light into said ionizing radiation shielding enclosure and to the image sensor,
an ionizing radiation shield,
a heat absorbing cooling element connected to the camera module, said cooling element functioning to dissipate heat from the camera module,
a pivot structure for simultaneously pivoting the ionizing radiation shielding enclosure together with the camera module, with the electronic image sensor and lens package within the ionizing radiation shielding enclosure, as a unit, relative to the ionizing radiation shield between an adjustable active position in which the ionizing radiation shielding enclosure opening is uncovered, and a shielded position in which the ionizing radiation shielding enclosure opening is directed towards the ionizing radiation shield; and
a support structure on which the ionizing radiation shield is mounted and on which the pivot structure is mounted to enable the ionizing radiation shield and the ionizing radiation shielding enclosure, with the camera module therein, to move together in a desired rotational pan direction.

2. An ionizing radiation tolerant camera as claimed in claim 1, wherein the heat absorbing cooling element is thermally connected to a cooling device.

3. An ionizing radiation tolerant camera as claimed in claim 2, wherein the cooling device comprises a thermoelectric cooling module.

4. An ionizing radiation tolerant camera as claimed in claim 1, wherein heat pipes are provided for dissipation of heat from the heat absorbing cooling element to a position outside of the ionizing radiation shielding enclosure.

5. An ionizing radiation tolerant camera as claimed in claim 4, wherein the heat pipes extend substantially horizontally.

6. An ionizing radiation tolerant camera as claimed in claim 4, wherein the heat pipes are connected to a heat sink mounted on an outside wall of the enclosure.

7. An ionizing radiation tolerant camera as claimed in claim 1, wherein the ionizing radiation shielding enclosure is made from a material comprising hydrocarbon plastics.

8. An ionizing radiation tolerant camera as claimed in claim 7, wherein the ionizing radiation shielding enclosure is made from a material comprising boron.

9. An ionizing radiation tolerant camera as claimed in claim 1, wherein the ionizing radiation shielding enclosure has an average thickness of 3-10 cm.

10. An ionizing radiation tolerant camera as claimed in claim 9, wherein the ionizing radiation shielding enclosure has an average thickness of about 5 cm.

11. An ionizing radiation tolerant camera as claimed in claim 1, wherein the opening is covered by a transparent front panel.

12. An ionizing radiation tolerant camera as claimed in claim 1, wherein the camera module is arranged in an insulating and moisture-proof body.

13. An ionizing radiation tolerant camera as claimed in claim 12, wherein the camera module is enclosed in a housing.

14. An ionizing radiation tolerant camera as claimed in claim 13, wherein the housing comprises neutron radiation shielding material.

15. An ionizing radiation tolerant camera as claimed in claim 12, wherein the camera module is enclosed in a gamma radiation shielding layer.

16. An ionizing radiation tolerant camera as claimed in claim 1,
further comprises a motorized actuator for said pivot structure; and
the ionizing radiation shielding enclosure with the camera module disposed therein, is powered by said motorized actuator to pivot as a unit in relation to said ionizing radiation shield between a shielded position in which the opening of the ionizing radiation shielding enclosure is directed toward said ionizing radiation shield and the adjustable operating position in which the opening of the ionizing radiation shielding enclosure is uncovered.

* * * * *